United States Patent
Jang (10) Patent No.: US 10,171,688 B2
(45) Date of Patent: Jan. 1, 2019

(54) MANAGEMENT SERVER TO RECEIVE SCANNED IMAGES AND ALIGN THE SCANNED IMAGES BASED ON PAGE NUMBERS INCLUDED IN THE SCANNED IMAGES

(71) Applicant: S-PRINTING SOLUTION CO., LTD., Suwon-si, Gyeonggi-do (KR)

(72) Inventor: Young-dae Jang, Seoul (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 14/156,909

(22) Filed: Jan. 16, 2014

(65) Prior Publication Data

US 2014/0204414 A1    Jul. 24, 2014

(30) Foreign Application Priority Data

Jan. 24, 2013  (KR) .......................... 10-2013-0008198

(51) Int. Cl.
   *H04N 1/00*   (2006.01)
(52) U.S. Cl.
   CPC . *H04N 1/00244* (2013.01); *H04N 2201/0081* (2013.01); *H04N 2201/3245* (2013.01); *H04N 2201/3247* (2013.01); *H04N 2201/3274* (2013.01)

(58) Field of Classification Search
   CPC ......................................................... H04N 1/00
   See application file for complete search history.

(56) References Cited

U.S. PATENT DOCUMENTS

| 2001/0012410 | A1* | 8/2001 | Michiie ............. G06F 17/30244 382/305 |
| 2007/0046979 | A1* | 3/2007 | Minowa ........................ 358/1.15 |
| 2007/0195378 | A1* | 8/2007 | Yoshida ............. H04N 1/00795 358/470 |
| 2008/0080020 | A1* | 4/2008 | Shimasaki et al. ........... 358/474 |
| 2008/0304704 | A1* | 12/2008 | Philip et al. .................. 382/101 |
| 2010/0231982 | A1* | 9/2010 | Mihira ............... H04N 1/00222 358/402 |

FOREIGN PATENT DOCUMENTS

| JP | 11-219270 | 8/1999 |
| JP | 2002-368945 | 12/2002 |
| JP | 3760733 | 3/2006 |
| JP | 2006-217212 | 8/2006 |

\* cited by examiner

*Primary Examiner* — Lennin R Rodriguezgonzalez
(74) *Attorney, Agent, or Firm* — Staas & Halsey LLP (57) ABSTRACT

An image scanning apparatus, a control method of an image scanning apparatus connectable to a management server, a management server and control method thereof are provided. The control method includes scanning a manuscript to generate a scanned image, generating page information for the generated scanned image, adding the generated page information to the generated scanned image, and transmitting the page information-added scanned image to the management server.

9 Claims, 10 Drawing Sheets

MANAGEMENT SERVER TO RECEIVE SCANNED IMAGES AND ALIGN THE SCANNED IMAGES BASED ON PAGE NUMBERS INCLUDED IN THE SCANNED IMAGES

CROSS-REFERENCE TO RELATED APPLICATIONS

This application is related to, and claims priority to, Korean Patent Application No. 10-2013-0008198, filed on Jan. 24, 2013, in the Korean Intellectual Property Office, the disclosure of that is incorporated herein by reference.

BACKGROUND

1. Field

Exemplary embodiments of the present invention relate to an image scanning apparatus and a control method thereof, and a management server and a control method thereof, and more particularly, to an image scanning apparatus capable of improving processing speed of a large amount of original manuscripts in a copy task or a scanning operation and a control method thereof, and a management server and a control method thereof.

2. Description of the Related Art

An image scanning apparatus is an apparatus that scans an original image such as a document, a picture, or a film and converts the scanned image into digital data. The digital data may be displayed in a monitor of a computer and/or printed by a printer and an output image may be generated. Types of the image scanning apparatuses, include scanners, copiers, facsimiles, and multiple function peripherals (MFPs) configured to implement a plurality of functions thereof in one apparatus, and the like.

When an image scanning apparatus, e.g., a MFP performs a copy task or a scanning operation for processing a large amount of documents, a lot of time is spent since an operation from input of a document to output of a printed matter is performed in one image scanning apparatus.

That is, in the related art, when the image scanning apparatus scans and processes a large amount of data, e.g., original manuscripts such as a book, a lot of time is spent since the operation from the input of a document to the output of a printed matter is performed in one image scanning apparatus.

SUMMARY

One or more exemplary embodiments of the present invention may overcome the above disadvantages and/or other disadvantages not described above. However, it is understood that one or more exemplary embodiment are not required to overcome the disadvantages described above.

According to an exemplary embodiment an image scanning apparatus and a control method thereof are provided that divide an original manuscript, scan the divided original manuscript through a plurality of image scanning apparatuses, add page information to the scanned images generated through the scanning, and transmit the page information-added scanned images to a management server.

According to an exemplary embodiment a management server and a control method thereof are provided that arrange and store a plurality of received scanned images based on page information in the plurality of scanned images received from each of a plurality of image scanning apparatuses.

According to an aspect of an exemplary embodiment, a control method of an image scanning apparatus connectable to a management server is provided. The control method may include scanning a manuscript to generate a scanned image; generating page information for the generated scanned image, adding the generated page information to the generated scanned image; and transmitting the page information-added scanned image to the management server.

The method may include receiving a page number for the scanned image. The generating may include generating the page information for the generated scanned image using the received page number.

The method may include performing character recognition on the scanned image. The generating may include generating the page information for the generated scanned image using the page number recognized according to the character recognition.

The method may include receiving a job identification (ID) for identifying each of a plurality of scanning jobs performed in the image scanning apparatus. The adding may include adding job identification information corresponding to the received job ID to the generated scanned image.

The method may include displaying information of a surrounding image scanning apparatus connected to the management server. The information of the surrounding image scanning apparatus may include at least one selected from the group consisting of identification information of the surrounding image scanning apparatus, location information of the surrounding image scanning apparatus, and performance information of the surrounding image scanning apparatus.

According to an aspect of an exemplary embodiment, a control method of a management server connectable to a plurality of image scanning apparatuses is provided. The control method may include receiving a plurality of scanned images having page information from each of the plurality of image scanning apparatuses, aligning the plurality of received scanned images based on the page information in the plurality of received scanned images; and storing the plurality of aligned scanned images.

The method may include printing the plurality of aligned scanned images through an image forming apparatus.

Each of the plurality of scanned images received from each of the plurality of image scanning apparatuses may include job identification information for identifying each of a plurality of scanning jobs. The method may include determining whether the plurality of received scanned images are a scanning image corresponding to a new job or a scanning image corresponding to an existing job based on the job identification information in the plurality of received scanned images.

The storing may include storing the plurality of aligned scanned images in one file.

The storing may include correcting and storing file names of the plurality of scanned images based on the page information in each of the plurality of scanned images.

According to an aspect of an exemplary embodiment, there is provided an image scanning apparatus connectable to a management server. The image scanning apparatus may include: a communication unit; a scanner configured to scan a manuscript; and a controller configured to generate page information for a scanned image generated according to the scanning, add the generated page information to the generated scanned image, and control the communication unit to transmit the page information-added scanned image to the management server.

The image scanning apparatus may include an input unit configured to receive a page number for the scanned image and the controller may generate the page information for the generated scanned image using the received page number.

The controller may perform character recognition on the scanned image and generate the page information for the generated scanned image using the page number recognized according to the character recognition.

The image scanning apparatus may include an input unit configured to receive a job identification (ID) for identifying each of a plurality of scanning jobs performed in the image scanning apparatus. The controller may add job identification information corresponding to the received job ID to the generated scanned image.

The image scanning apparatus may include a display configured to display information of a surrounding image scanning apparatus connected to the management server. The information of the surrounding image scanning apparatus may include at least one selected from the group consisting of identification information of the surrounding image scanning apparatus, location information of the surrounding image scanning apparatus, and performance information of the surrounding image scanning apparatus.

According to an aspect of an exemplary embodiment, there is provided a management server connectable to a plurality of image scanning apparatuses. The management server may include a communication unit configured to receive a plurality of scanned images having page information from each of the plurality of image scanning apparatuses, a controller configured to align the plurality of received scanned images based on the page information in the plurality of received scanned images, and a storage unit configured to store the plurality of aligned scanned images.

The controller may control the plurality of aligned scanned images to be printed through an image forming apparatus.

Each of the plurality of scanned images received from each of the plurality of image scanning apparatuses may include job identification information for identifying each of a plurality of scanning jobs. The controller may determine whether the plurality of received scanned images are a scanning image corresponding to a new job or a scanning image corresponding to an existing job based on the job identification information in the plurality of scanned images.

The storage unit may store the plurality of aligned scanned images in one file.

According to an aspect of an exemplary embodiment, there is provided a computer-readable recording medium in that a program code for executing a control method of a management server connectable to a plurality of image scanning apparatuses is recorded. The control method may include receiving a plurality of scanned images having page information from each of the plurality of image scanning apparatuses, aligning the plurality of received scanned images based on the page information in the plurality of received scanned images, and storing the plurality of aligned scanned images.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in that.

DETAILED DESCRIPTION

Exemplary embodiments are described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
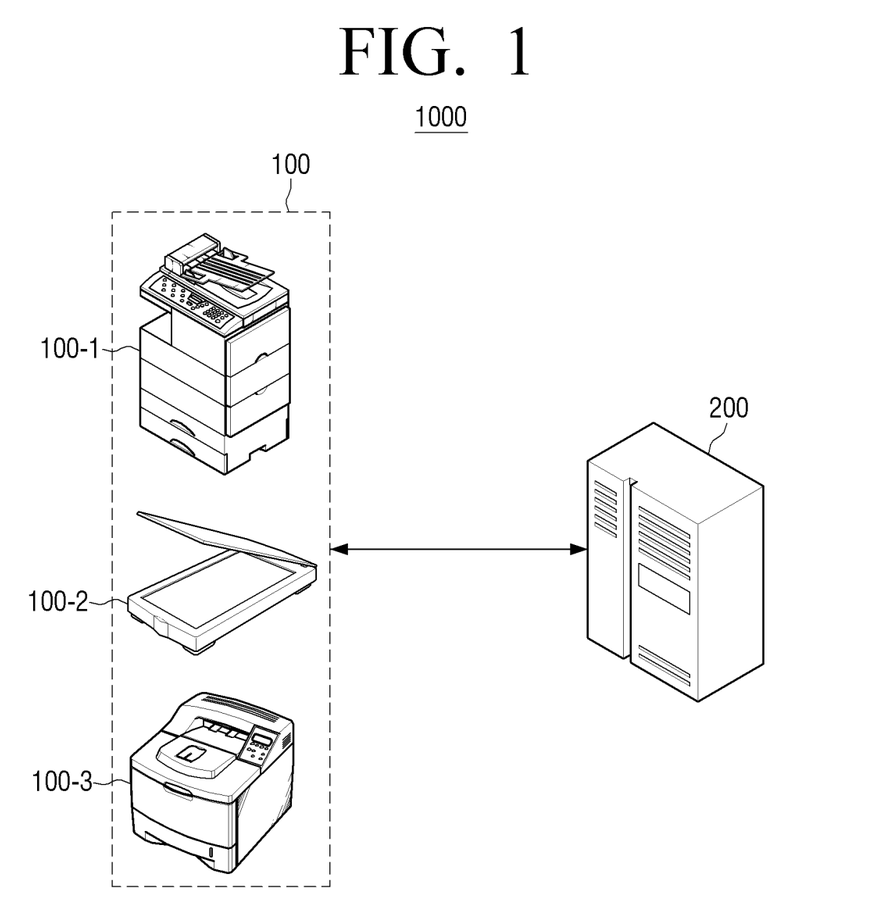
FIG. 1 is a view illustrating a scanning image management system according to an exemplary embodiment.

FIG. 1 is a view illustrating a scanning image management system according to an exemplary embodiment. As illustrated in FIG. 1, a scanning image management system 1000 may wholly or partially include a plurality of apparatuses 100-1, 100-2, . . . , 100-n (hereinafter, collectively referred to as 100) including at least one image scanning apparatus and at least one image forming apparatus and a management server 200.

The image scanning apparatus is an apparatus that scans an original image such as a document, a picture, or a film and converts the scanned image into digital data and for example. The image scanning apparatus may include a scanner, a copier, a facsimile, a MFP configured to implement plurality of functions thereof through one apparatus, and the like.

The image forming apparatus is an apparatus that prints generated print data on a recording paper and, for example, the image forming apparatus may include a copier, a printer, a facsimile, a MFP configured to implement a plurality of functions thereof through one apparatus, and the like.

The management server 200 may be a server that is connectable to the plurality of apparatuses 100 and controls the plurality of apparatuses 100.

At least one image scanning apparatus in the plurality of apparatuses 100 may scan a manuscript to generate a scanned image. That is, when the manuscript is input to each of a first image scanning apparatus, a second image scanning apparatus, . . . , an $N^{th}$ image scanning apparatus included in the plurality of apparatuses 100, each of the first image scanning apparatus, the second image scanning apparatus, . . . , the $N^{th}$ image scanning apparatus may generate a scanned image for the input manuscript. The manuscript may be at least one page and therefore, at least one scanned image may generated.

The at least one image scanning apparatus in the plurality of apparatuses 100 generate page information for the generated scanned image. For example, when a plurality of generated scanned images are generated, the at least one image scanning apparatus may generate the page information for each of the plurality of generated scanned images.

The page information for the generated scanned image may be generated using a page number received from the user. Alternatively, the page information for the generated scanned image may be generated using a page number recognized according to character recognition performed on the scanned image.

The at least one image scanning apparatus in the plurality of apparatuses 100 may add the generated page information to the generated scanned image. For example, when the plurality of generated scanned images are generated, the at least one image scanning apparatus may add the generated page information corresponding to each of the plurality of generated scanned images to each of the plurality of generated scanned images.

The at least one image scanning apparatus in the plurality of apparatuses 100 may transmit the page information-added scanned image to the management server 200. The at least one image scanning apparatus in the plurality of apparatuses 100 may integrate the plurality of page information-added scanned images, generate the integrated scanned image in one file, and transmits the one file for the integrated scanned image once. Alternatively, the at least one image scanning apparatus may generate each of the plurality of scanned images in one file and transmit the plurality of files for the plurality of scanned image over several times.

The management server 200 may receive a plurality of scanned images having the page information from the at least one image scanning apparatus in the plurality of apparatuses 100. That is, the management server 200 may receive the scanned images having the page information generated in each of the first image scanning apparatus, the second image scanning apparatus, . . . , the $N^{th}$ image scanning apparatus included in the plurality of apparatuses 100 from each of the first image scanning apparatus, the second image scanning apparatus, . . . , the $N^{th}$ image scanning apparatus.

The management server 200 may align the plurality of the received scanned images based on the page information in each of the plurality of received scanned images. That is, the management server 200 may sequentially align the plurality of received scanned images in order of a page based on the page information in each of the plurality of received scanned images.

The management server 200 may store the plurality of aligned scanned images. The management server 200 may store the plurality of aligned scanned image in one file. The management server 200 may correct and store file names of the plurality of scanned images based on the page information in each of the scanned images.

The management server 200 may print the plurality of aligned scanned images using at least one image forming apparatus in the plurality of apparatuses 100. The management server 200 may print all the plurality of aligned scanned images using one image forming apparatus in the plurality of apparatuses 100.

The management server 200 may divide and print the plurality of aligned scanned images using two or more image forming apparatuses in the plurality of apparatuses 100.

The at least one image scanning apparatus in the plurality of apparatuses 100 may receives a job ID for identifying each of a plurality of scanning jobs performed in the corresponding image scanning apparatus. The at least one image scanning apparatus in the plurality of apparatuses 100 may further add job identification information corresponding to the received job ID to the generated scanned image.

The management server 200 may determine whether the plurality of received scanned images are a scanning image corresponding to a new job or a scanning image corresponding to an existing job based on job identification information in each of the plurality of received scanned images.

The plurality of image scanning apparatuses 100 may display information of a surrounding image scanning apparatus and/or an image forming apparatus connected to the management server 200. The information of the surrounding image scanning apparatus and/or the image forming apparatus may include at least one selected from the group consisting of identification information of the surrounding image scanning apparatus and/or the image forming apparatus, location information of the surrounding image scanning apparatus and/or image forming apparatus, and performance information of the surrounding image scanning apparatus and/or the image forming apparatus.

FIG. 1 illustrates a management server 200 that may be implemented with a stand-alone server, but it is merely an example and the inventive concept is not limited thereto. Therefore, the management server 200 may be implemented with a cloud server connected to the plurality of apparatuses 100. Alternatively, the management server 200 may be implemented with a host apparatus connected to the plurality of apparatuses 100.

Figure 2:
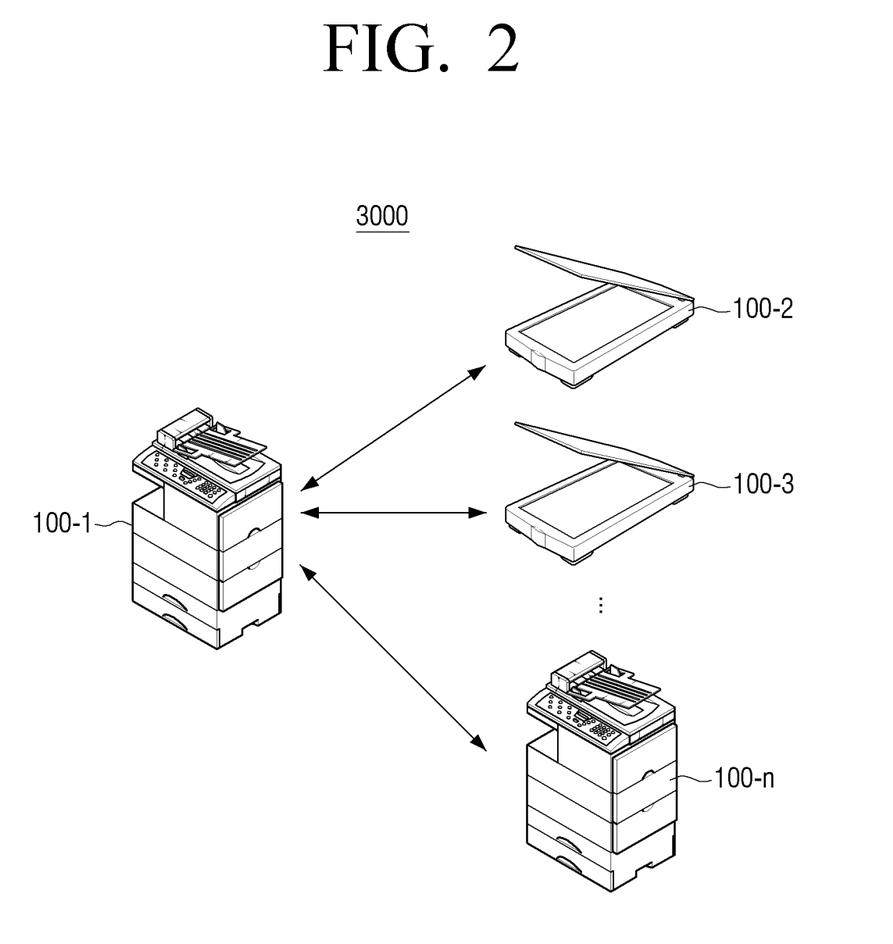
FIG. 2 is a view illustrating a scanning image management system according to an exemplary embodiment.

The management server 200 may be provided in one of the plurality of apparatuses 100 and the one of the plurality of apparatuses 100 may perform the above-described functions of the management server 200. The scanning image management system 1000 may be implemented as illustrated in FIG. 2.

Figure 3:
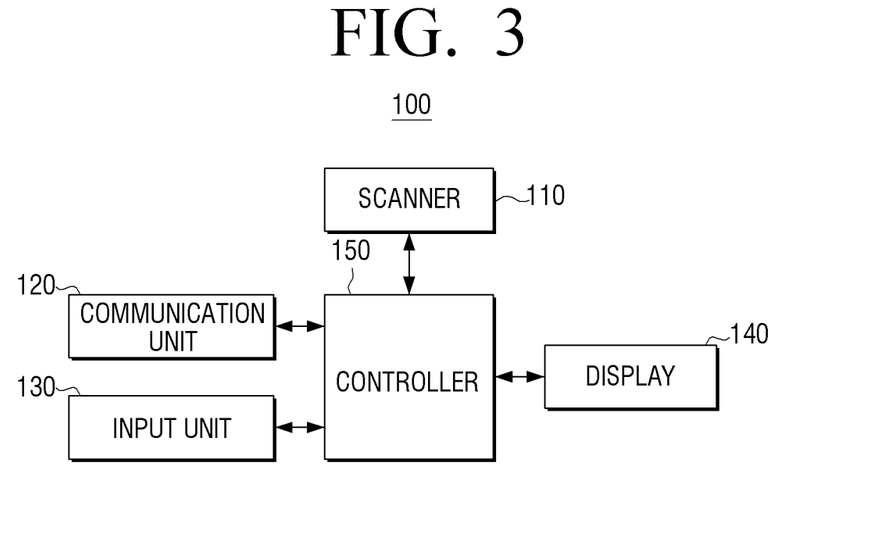
FIG. 3 is a block diagram illustrating an image scanning apparatus according to an exemplary embodiment.

FIG. 3 is a block diagram illustrating an image scanning apparatus according to an exemplary embodiment. As illustrated in FIG. 3, an image scanning apparatus 100 may partially, or wholly, include a scanner 110, a communication unit 120, an input unit 130, a display 140, and a controller 150. The image scanning apparatus 100 may be an image scanning apparatus that is a flatbed type, an auto document feeder (ADF) type, or a combination thereof according to a manuscript input type.

The scanner 110 scans an input manuscript according to the flatbed type and/or the ADF type. The scanner 110 may image light reflected from the manuscript in an image sensor of the inside thereof and scan image information of the manuscript from the light imaged in the image sensor.

The image sensor of the scanner 110 may be implemented with a complementary metal oxide semiconductor (CMOS) image sensor or a charge-coupled device (CCD).

The communication unit 120 may connect the image scanning apparatus 100 and an external apparatus. The communication unit 120 may connect the image scanning apparatus 100 and the management server 200.

The communication unit 120 may connect the image scanning apparatus 100 and the management server 200 through a wireless and/or wired connection manner using a local area network (LAN) and an Internet network and through a connection manner using a universal serial bus (USB) port.

The input unit 130 receives user input for the image scanning apparatus 100. The input unit 130 may receive various user inputs such as user input for controlling power on/off and user input for setting scan/copy options.

The input unit 130 may receive a page number for a scanned image. The page number may be input before performing a scanning job for a manuscript or after performing the scanning job for a manuscript.

The input unit 130 may receive selection for a region of the scanned image on that character recognition may be performed. The selection may be input before performing the scanning job for a manuscript or after performing the scanning job for a manuscript.

The input unit 130 may receive a job ID for identifying each of a plurality of scanning jobs performed in the image scanning apparatus. The job ID may be input before performing the scanning job for a manuscript or after performing the scanning job for a manuscript.

The input unit 130 may be implemented with at least one selected from the group consisting of various buttons, a touch sensor configured to receive touch input to the display 140, a proximity sensor configured not to be in contact with a surface of the display 140 and to receive an approaching motion, and a microphone configured to receive voice input of a user. The input unit 130 may be implemented that an input device such as a mouse, a keyboard, and a remote controller is combined with a display device such as the display 140. Therefore, the input unit 130 may receive various user inputs such as touch input, motion input, and voice input.

The display 140 may display a screen. The display 140 may display various screens such as a screen for setting scan/copy options.

The display 140 may display a screen configured to receive a page number for the scanned image. The screen configured to receive the page number for the scanned image may be displayed before performing the scanning job for a manuscript or after performing the scanning job for the manuscript.

The display 140 may display a screen configured to receive selection for a region of the scanned image on that character recognition is to be performed. The screen configured to receive the region of the scanned image on that the character recognition is to be performed may be displayed before performing the scanning job for a manuscript or after performing the scanning job for a manuscript.

The display unit 140 may display a screen configured to receive a job ID for identifying each of a plurality of scanning jobs performed in the image scanning apparatus. The screen configured to receive the job ID may be display before performing the scanning job for a manuscript or after performing the scanning job for a manuscript.

The display unit 140 may display information of a surrounding image scanning apparatus connected to the management server 200.

The display unit 140 may be implemented, for example, as one or more of a liquid crystal display (LCD), a thin film transistor-liquid crystal display (TFT-LCD), an organic light-emitting diode (OLED), a flexible display, and a three-dimensional (3D) display.

The controller 150 controls an overall operation of the image scanning apparatus 100. The controller 150 may wholly, or partially, control the scanner 110, the communication unit 120, the input unit 130, and the display 140.

The controller 150 may generate page information for the scanned image generated according to the scanning. The controller 150 may generate the page information for the generated scanned image using the page number received through the input unit 130. For example, the user may input a page number of a first page of a plurality of input manuscripts in a page number input screen displayed before performing the scanning job for a manuscript or after performing the scanning job for a manuscript. The controller 150 may generate the page information for the scanned image generated according to the scanning of the first page among the plurality of manuscripts using the first page number input from the user. The controller 150 may sequentially assign the number based on the input first page number and generate the page information for each of the plurality of scanned images generated according to the scanning for the plurality of manuscripts. Therefore, when the page information for each of the plurality of scanned images generated according to the scanning for the plurality of manuscripts is generated, the controller 150 may add the generated page information to a corresponding scanned image.

The controller 150 may perform character recognition on the scanned image and generate page information for the generated scanned image using the page number recognized according to the character recognition. For example, the user may select a region of each of the plurality of manuscripts on that the page number is listed in a character recognition region selection screen displayed before performing the scanning job for a manuscript or after performing the scanning job for a manuscript. The controller 150 may perform a character recognition function, that is, an optical character reader on the selected region to recognize the page number listed on each of the plurality of manuscripts and generate the page information for each of the plurality of scanned images using the recognized page number. Therefore, when the page information for each of the plurality of scanned images generated according to the scanning of the plurality of manuscripts is generated, the controller 150 may add the generated page information to a corresponding scanned image.

The controller 150 may add job identification information corresponding to the received job ID to the generated scanned image. For example, the user may select the job ID to be assigned to a corresponding scanning job in a job ID selection screen displayed before performing the scanning job for a manuscript or after performing the scanning job for a manuscript. The job ID may be an ID for identifying each of the plurality of scanning jobs performed in the image scanning apparatus 100. When the scanning job corresponding to the selected job ID is performed, the controller 150 may add the job identification information corresponding to the selected job ID to each of the plurality of scanned images generated according to a corresponding scanning job.

The controller 150 may add identification information of the image scanning apparatus to the generated scanned image. The information of the image scanning apparatus may be information for identifying a corresponding image scanning apparatus with a surrounding image scanning apparatus.

When the page information, the job identification information, and the image scanning apparatus identification information are added to the corresponding scanned image according to the above-described operations, the controller 150 may control the communication unit 120 to transmit the plurality of scanned images to that the above-described pieces of information are added to the management server 200. The controller 150 may generate the plurality of scanned images to that the above-described pieces of information are add in one file and transmit the one file for the plurality of scanned images once or the controller 150 may generate each of the plurality of scanned images in one file and transmit the files for the plurality of scanned images over several times.

Figure 4:
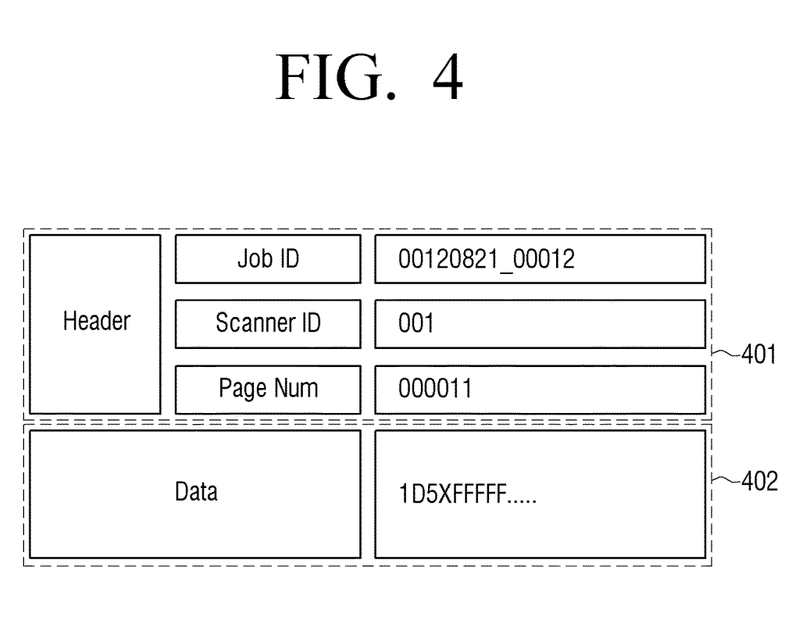
FIG. 4 is a view illustrating a data format of a scanned image generated in an image scanning apparatus according to an exemplary embodiment.

A data format of the scanned image generated according to the an exemplary operation of the controller 150 is illustrated in FIG. 4.

FIG. 4 is a view illustrating a data format of a scanned image generated in the image scanning apparatus according to an exemplary embodiment. As illustrated in FIG. 4, the data format of the scanned image may include a header region 401 configured to record, for example, page information (Page Num: 000011), job identification information (Job ID: 00120821_00012), and image scanning apparatus identification information (Scanner ID: 001). A data region 402 may be configured to record data for the scanned image generated according to the scanning of the manuscript. That is, the controller 150 may generate the data format, as illustrated in FIG. 4, for each of the plurality of scanned images generated according to the scanning of the plurality of manuscripts and transmit the generate data format to the management server 200.

The controller 150 may control the display 140 to display a surrounding image scanning apparatus and/or an image forming apparatus connected to the management server 200. The controller 150 may display the information using information of the surrounding image scanning apparatus and/or the image forming apparatus connected to the management server 200 received from the management server 200. The information of the surrounding image scanning apparatus and/or the image forming apparatus may include at least one of identification information of the surrounding image scanning apparatus and/or the image forming apparatus, location information of the surrounding image scanning apparatus and/or the image forming apparatus, and performance information of the surrounding image scanning apparatus and/or the image forming apparatus.

Therefore, the user may easily search and use an image scanning apparatus and/or an image forming apparatus (for example, an image forming apparatus supporting color printer) supporting required performance. The user may easily search and use an image scanning apparatus and/or an image forming apparatus close to a current location of the user.

Figure 5:
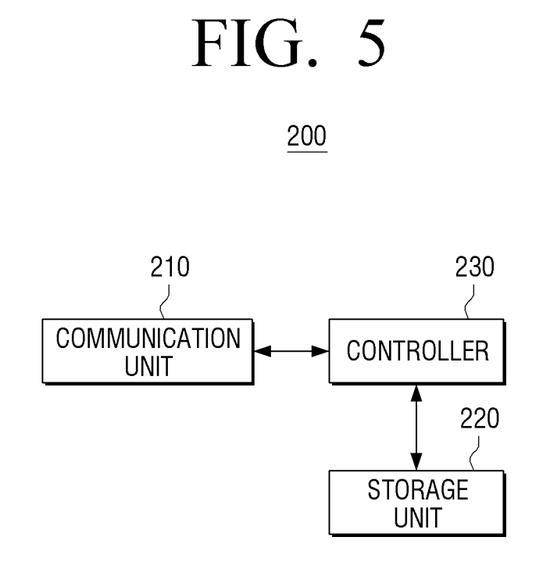
FIG. 5 is a block diagram illustrating a management server according to an exemplary embodiment.

FIG. 5 is a block diagram illustrating a management server according to an exemplary embodiment. As illustrated in FIG. 5, a management server 200 may wholly, or partially include, a communication unit 210, a storage unit 220, and a controller 230.

The communication unit 210 connects the management server 200 to an external apparatus. The communication unit 210 may connect the management server 200 to a plurality of apparatuses (100, for example, in FIG. 1) including at least one image scanning apparatus and at least one image forming apparatus. Therefore, the communication unit 210 may receive a plurality of scanned images having page information from each of a plurality of image scanning apparatuses.

The communication unit 210 may connect the management server to the plurality of apparatuses 100 through a wireless or wired connection manner using an LAN and an Internet network as well as through a connection manner using a USB port.

The storage unit 220 may store various programs and data required for an operation of the management sever 200. In particular, the storage unit 220 may align and store the plurality of received scanned images under control of the controller 230.

The storage unit 220 may be implemented with an embedded storage device such as a random access memory (RAM), a flash memory, a read only memory (ROM), an erasable programmable ROM (EPROM), an electronically erasable and programmable ROM (EEPROM), a register, a hard disc, a removable disc, and a memory card and a detachable storage device such as a USB memory.

The controller 230 controls an overall operation of the management server 200. The controller 230 may wholly, or partially, control the communication unit 210 and the storage unit 220.

The controller 230 may align the plurality of received scanned image based on the page information in each of the plurality of the plurality of received scanned images. An exemplary aligning method is illustrated in FIGS. 6A -6B.

Figure 6A:
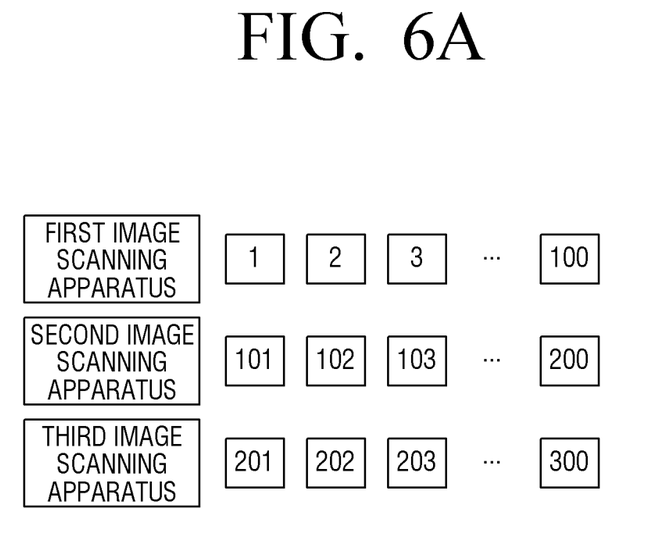
FIGS. 6A-6B illustrate an exemplary method of aligning a plurality of scanned images based on page information by a management server according to an exemplary embodiment.
Figure 6B:
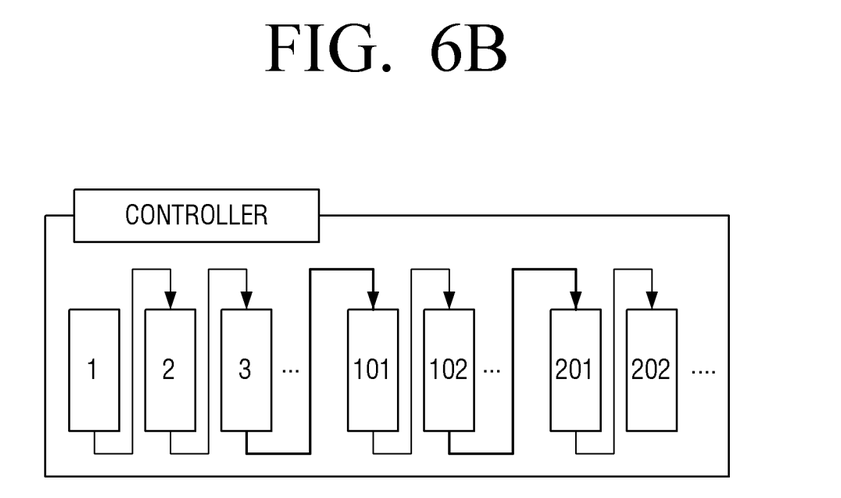

FIGS. 6A-6B illustrate a method of aligning a plurality of scanned images based on the page information by the management server according to an exemplary embodiment. As illustrated in FIG. 6A, a plurality of scanned images having page information of 1 to 100 may be received from a first image scanning apparatus included in the plurality of apparatuses 100, a plurality of scanned image having page information of 101 to 200 may be received from a second image scanning apparatus included in the plurality of apparatuses 100, and a plurality of scanned images having page information of 201 to 300 may be received from a third image scanning apparatus included in the plurality of apparatuses 100. The controller 230 may sequentially align the plurality of received scanned images, for example, in page order, e.g., from a first page to a $300^{th}$ page based on the page information in each of the plurality of scanned images received from each of the first image scanning apparatus, the second image scanning apparatus, and the third image scanning apparatus as illustrated in FIG. 6B.

The plurality of scanned images received from each of a plurality of scanned image apparatuses included in the plurality of apparatuses 100 may further include job identification information for identifying a plurality of scanning jobs and image scanning apparatus identification information for identifying the plurality of image scanning apparatuses.

The controller 230 may determine whether the plurality of received scanned images are a scanning image corresponding to a new job or a scanning image corresponding to an existing job based on the job identification information in the plurality of received scanned images.

The controller 230 may determine that the plurality of received scanned images are the scanning image corresponding to the new job when the job identification information of the plurality of received scanned images is not pre-registered job identification information. The controller 230 may generate a scanned image list for the new job.

The controller 230 may determine that the plurality of received scanned images are the scanning image corresponding to the existing job when the job identification information in the plurality of received scanned image is a pre-registered job identification information. The controller 230 may add the plurality of received scanned images to the list for existing jobs and generate a list.

The controller 230 may hierarchically link and manage the generated list using the job identification information, the image scanning apparatus identification information, and the page information. An exemplary method of linking and managing the list is illustrated in FIG. 7.

Figure 7:
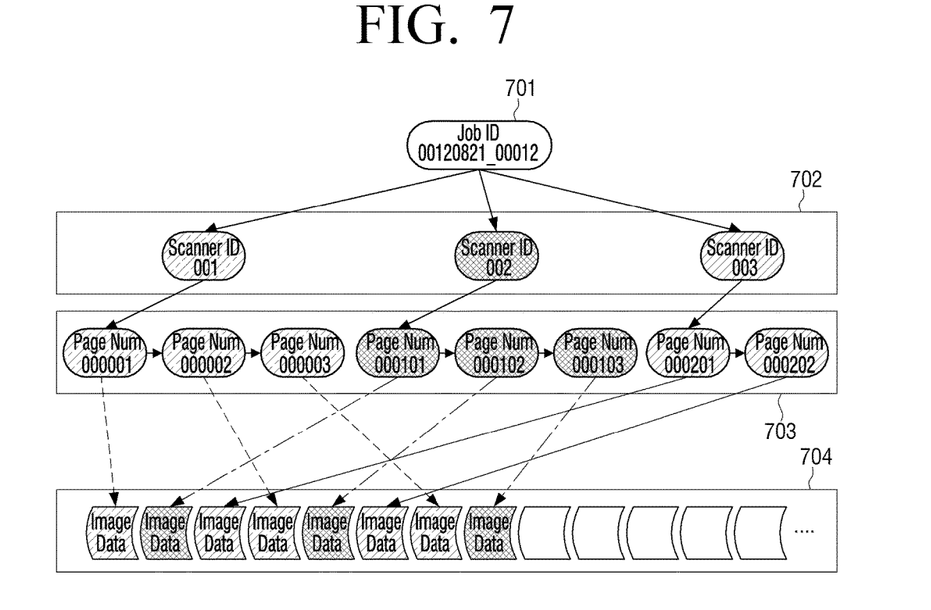
FIG. 7 is a view explaining a method of hierarchically linking and managing a generated list by a management server according to an exemplary embodiment.

FIG. 7 is a view illustrating a method of hierarchically linking and managing a generated list by a management server according to an exemplary embodiment. As illustrated in FIG. 7, image data 704 for the plurality of scanned images may be hierarchically linked according to job identification information 701, image scanning apparatus identification information 702, and page information 703. That is, the management server 200 may link the image scanning apparatus identification information (Scanner ID 702) to the job identification information 701 (Job ID 00120821_00012) in the plurality of received scanned images, link the page information 703 to the image scanning apparatus identification information (Scanner ID 702), link the image data 704 for the plurality of scanned images to the page information 703, and manage the image data 704 for the plurality of scanned images.

The controller 230 may align and manage the plurality of received scanned images by sequentially aligning the page information in the link.

The controller 230 may print the plurality of aligned scanned images using the at least one image forming apparatus in the plurality of apparatuses 100. For example, the controller 230 may print all the plurality of aligned scanned images of from a first page to a 300$^{th}$ page using one image forming apparatus in the plurality of apparatuses 100.

The management server 200 may divide and print the scanned images, e.g., from the first page to the 150$^{th}$ page among the scanned images of the first page to the 300$^{th}$ page using the first image forming apparatus in the plurality apparatuses 100, and divide and print the scanned images from the 151$^{st}$ page to 300$^{th}$ page among the scanned images of the first page to 300$^{th}$ page using the second image forming apparatus.

The controller 230 may store the plurality of aligned scanned images in the storage unit 220. The controller 230 may store the plurality of aligned scanned images in one file in the storage unit 220. Alternatively, the controller 230 may correct and store file names of the plurality of scanned images based on the page information in each of the plurality of scanned images.

FIG. 5 illustrates an example in which the management server 200 is implemented with a server, but it is merely an example and the inventive concept is not limited thereto. Therefore, the management server 200 may be implemented with a cloud server connected to the plurality of apparatuses 100. Alternatively, the management server 200 may be implemented with a host apparatus connected to the plurality of apparatuses 100. The management server 200 may be implemented so that the management server 200 is provided in one, or more, of the plurality of apparatuses 100 and the one or more apparatus among the plurality of apparatuses 100 performs the above-described function of the management server 200.

According to various exemplary embodiments, when scanning and processing a large amount of manuscripts such as a book, the user may save time by integrally operating the plurality of image scanning apparatuses, the management server, and the image forming apparatus.

The user may have an efficiency and usability of a MFP, which has a high performance, but has a high cost, by integrally operating the plurality of image scanning apparatuses having a lower cost, the management server, and the image forming apparatus.

A flexible system with improved performance may be achieved adding a varied number of only the image scanning apparatus.

Figure 8:
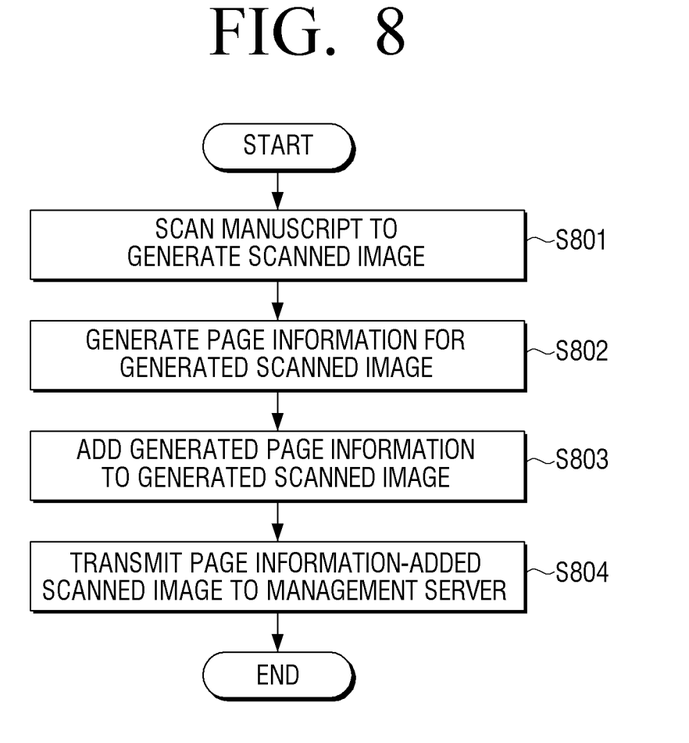
FIG. 8 is a flowchart illustrating a control method of an image scanning apparatus according to an exemplary embodiment.

FIG. 8 is a flowchart illustrating a control method of an image scanning apparatus according to an exemplary embodiment. As illustrated in FIG. 8, the image scanning apparatus scans a manuscript to generate a scanned image (S801).

The image scanning apparatus generates page information for the generated scanned image (S802). The generating in operation S802 includes generating the page information for the generated scanned image using a page number received from the user. The generating in operation S802 may include generating the page information for the generated scanned image using a page number recognized through character recognition in the scanned image.

When the page information for the generated scanned image is generated, the image scanning apparatus adds the generated page information to the generated scanned image (S803).

The image scanning apparatus transmits the page information-added scanned image to the management server (S804).

The control method of an image scanning apparatus according to an exemplary embodiment may further include receiving a job ID for identifying each of a plurality of scanning jobs performed in the image scanning apparatus. The adding in operation S803 may further include adding job identification information corresponding to the received job ID to the generated scanned image.

The image control method of an image scanning apparatus according to an exemplary embodiment may further include displaying information of a surrounding image scanning apparatus connected to the management server. The information of the surrounding image scanning apparatus may include at least one selected from identification information of the surrounding image scanning apparatus, location information of the surrounding image scanning apparatus, and performance information of the surrounding image scanning apparatus.

Figure 9:
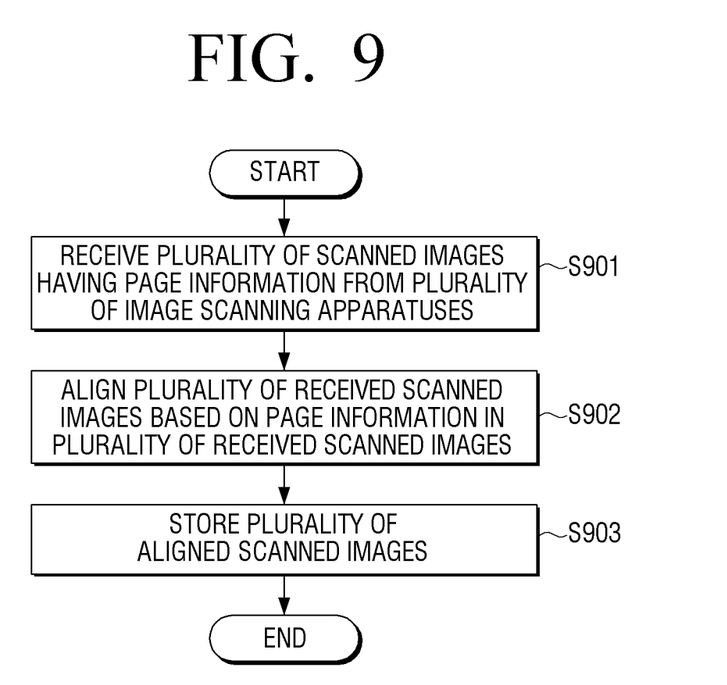
FIG. 9 is a flowchart illustrating a control method of a management server according to an exemplary embodiment.

FIG. 9 illustrates a control method of a management server according to an exemplary embodiment. As illustrated in FIG. 9, he management server receives a plurality of scanned images having page information from each of a plurality of image scanning apparatuses (S901).

The management server aligns the plurality of received scanned images based on the page information in each of the plurality of received scanned images (S902).

The management server stores the plurality of aligned scanned images (S903). The storing in operation S903 may include storing the plurality of aligned scanned images in one file. The storing in operation S903 may include correcting and storing file names of the plurality of scanned images based on the page information in each of the scanned images.

The control method of a management server according to an exemplary embodiment may include printing the plurality of aligned scanned images through an image forming apparatus.

The plurality of scanned images received from each of the plurality of image scanning apparatuses may further include job identification information for identifying each of a plurality of scanning jobs. The control method may further include determining whether the plurality of received scanned images are a scanning image corresponding to a new job or a scanning image corresponding to an existing job based on the job identification information in the plurality of received scanned images.

A control method of an image scanning apparatus and control method of a management server according to an exemplary embodiment of the present invention may be implemented with a program code, and the program code may be stored in various non-transitory computer-readable media and provided to apparatuses.

A non-transitory computer-recordable medium is not a medium configured to temporarily store data such as a register, a cache, a memory, and the like, but an apparatus-readable medium configured to semi-permanently store data. An exemplary embodiment of the present invention may be stored and provided in a non-transitory computer-recordable medium such as a compact disc (CD), a digital versatile disc (DVD), a hard disc (HD), a blu-ray disc, a USB, a memory card, a read only memory (ROM), and the like.

The foregoing exemplary embodiments and advantages are merely exemplary and are not to be construed as limiting the present inventive concept. The exemplary embodiments can be applied to other types of devices. The description of the exemplary embodiments is intended to be illustrative, and not to limit the scope of the claims, and alternatives, modifications, and variations will be apparent to those skilled in the art.

What is claimed is:

1. A non-transitory computer-readable recording medium in which a program code for executing a control method implemented by a processor of a management server connectable to a plurality of image scanning apparatuses is recorded, the control method comprising:
   receiving a plurality of scanned images having page information including a page number of the plurality of scanned images, from each of the plurality of image scanning apparatuses that scan each of a plurality of divided manuscripts that are divided from a manuscript;
   obtaining, at the processor, the page number of each of the plurality of received scanned images based on character recognition performed on the plurality of received scanned images;
   sequentially aligning, at the processor, the plurality of received scanned images based on the page number in the plurality of received scanned images;
   storing, at the processor, the plurality of aligned scanned images in one file in a storage; and
   determining, at the processor, whether the plurality of received scanned images are a scanning image corresponding to a new job or a scanning image corresponding to an existing job based on job identification information corresponding to the manuscript for identifying each of a plurality of scanning jobs, the job identification information being included in each of the plurality of scanned images received from each of the plurality of image scanning apparatuses.

2. The non-transitory computer-readable recording medium for executing the control method as claimed in claim 1, further comprising printing the plurality of aligned scanned images through an image forming apparatus.

3. The non-transitory computer-readable recording medium for executing the control method as claimed in claim 1, further comprising:
   determining, at the processor, the plurality of received scanned images are the scanning image corresponding to the new job when the job identification information in the plurality of received scanned images is not pre-registered job identification information, and
   determining, at the processor, the plurality of received scanned images are the scanning image corresponding to the existing job when the job identification information in the plurality of received scanned images is the pre-registered job identification information.

4. The non-transitory computer-readable recording medium for executing the control method as claimed in claim 1, further comprising receiving an input selection of a region of a first received scanned image among the plurality of received scanned images, and performing character recognition on the region to obtain the page number of the first received scanned image among the plurality of received scanned images.

5. A non-transitory computer-readable recording medium in which a program code for executing a control method implemented by a processor of a management server connectable to a plurality of image scanning apparatuses is recorded, the control method comprising:
   receiving a plurality of scanned images having page information including a page number of the plurality of scanned images, from each of the plurality of image scanning apparatuses that scan each of a plurality of divided manuscripts that are divided from a manuscript;
   obtaining, at the processor, the page number of each of the plurality of received scanned images based on character recognition performed on the plurality of received scanned images;
   sequentially aligning, at the processor, the plurality of received scanned images based on the page number in the plurality of received scanned images;
   storing, at the processor, the plurality of aligned scanned images in a storage;
   wherein the storing includes correcting and storing, at the processor, file names of the plurality of scanned images based on the page number in each of the plurality of scanned images; and
   determining, at the processor, whether the plurality of received scanned images are a scanning image corresponding to a new job or a scanning image corresponding to an existing job based on job identification information corresponding to the manuscript for identifying each of a plurality of scanning jobs, the job identification information being included in each of the plurality of scanned images received from each of the plurality of image scanning apparatuses.

6. The non-transitory computer-readable recording medium for executing the control method as claimed in claim 5, further comprising:
   determining, at the processor, the plurality of received scanned images are the scanning image corresponding to the new job when the job identification information in the plurality of received scanned images is not pre-registered job identification information, and
   determining, at the processor, the plurality of received scanned images are the scanning image corresponding to the existing job when the job identification information in the plurality of received scanned images is the pre-registered job identification information.

7. A management server connectable to a plurality of image scanning apparatuses, the management server comprising:
   a transceiver configured to receive a plurality of scanned images having page information including a page number of the plurality of scanned images, from each of the plurality of image scanning apparatuses that scan each of a plurality of divided manuscripts that are divided from a manuscript;

a processor to obtain the page number of each of the plurality of received scanned images based on character recognition performed on the plurality of received scanned images, to sequentially align the plurality of received scanned images based on the page number in the plurality of received scanned images, and to determine whether the plurality of received scanned images are a scanning image corresponding to a new job or a scanning image corresponding to an existing job based on job identification information corresponding to the manuscript for identifying each of a plurality of scanning jobs, the job identification information being included in each of the plurality of scanned images received from each of the plurality of image scanning apparatuses; and a memory to store the plurality of aligned scanned images in one file.

8. The management server as claimed in claim 7, wherein the processor is to control the plurality of aligned scanned images to be printed through an image forming apparatus.

9. The management server as claimed in claim 7, wherein the processor is to determine the plurality of received scanned images are the scanning image corresponding to the new job when the job identification information in the plurality of received scanned images is not pre-registered lob identification information, and the processor is to determine the plurality of received scanned images are the scanning image corresponding to the existing job when the job identification information in the plurality of received scanned images is the pre-registered job identification information.

\* \* \* \* \*

UNITED STATES PATENT AND TRADEMARK OFFICE
CERTIFICATE OF CORRECTION

PATENT NO. : 10,171,688 B2  
APPLICATION NO. : 14/156909  
DATED : January 1, 2019  
INVENTOR(S) : Young-dae Jang Page 1 of 1

It is certified that error appears in the above-identified patent and that said Letters Patent is hereby corrected as shown below:

In the Claims

In Column 14, Claim 7, Line 65, after "transceiver" delete "configured".

In Column 16, Claim 9, Line 11, delete "lob" and insert -- job --, therefor.

Signed and Sealed this  
Nineteenth Day of March, 2019

Andrei Iancu  
*Director of the United States Patent and Trademark Office*